United States Patent Office 2,807,519
Patented Sept. 24, 1957

2,807,519

PROCESS FOR THE PRODUCTION OF AN ACTIVATED FORM OF UO₂

Milton J. Polissar, San Francisco, Calif., assignor to the United States of America as represented by the United States Atomic Energy Commission No Drawing. Application March 11, 1946, Serial No. 653,689

6 Claims. (Cl. 23—14.5)

The present invention relates to activated uranium dioxide and more particularly relates to the process for producing a highly active form of $UO_2$ which is characterized both by rapid oxidation in air and by rapid chlorination with $CCl_4$ vapor at an elevated temperature.

Commercial $UO_2$ is ordinarily in the form of a chocolate brown powder and is stable in ordinary air at room temperature. In fact, this product exhibits no tendency to oxidize in ordinary air until it is heated to a temperature of the order of 100° C., under which conditions it is oxidized to the black oxide $U_3O_8$ in accordance with the following reaction:

$$3UO_2 + O_2 \rightarrow U_3O_8$$

This reaction is only normal in view of the fact that commercial $UO_2$ is ordinarily prepared by the reduction of $UO_3$ or $U_3O_8$ with H.

This great stability of commercial $UO_2$ is believed attributable to a surface characteristic and, while considerably simplifying the problem of storage before use, it is thought that this characteristic of commercial $UO_2$ primarily accounts for the moderate rate of chlorination of this product with $CCl_4$ vapor at an elevated temperature in order to produce $UCl_4$, as disclosed in the copending application of James M. Carter, Serial No. 490,293, filed June 10, 1943, which issued as Patent No. 2,677,592 on May 4, 1954, in which the following specific reactions are carried out:

$$UO_2 + 2CCl_4 \rightarrow UCl_4 + 2COCl_2$$
$$UO_2 + 2COCl_2 \rightarrow UCl_4 + 2CO_2$$

In my copending application, Serial No. 494,448, filed July 13, 1943, which issued as Patent No. 2,678,257 on May 11, 1954, it has been disclosed that $UO_3$ may be reduced with natural gas, consisting essentially of $CH_4$, in order to prepare $UO_2$, and that this product is highly active with respect to commercial $UO_2$ prepared by any other or previously known process, including the reduction of $UO_3$ and $U_3O_8$ with H. It is surmised that the surface condition of this activated form of $UO_2$ is responsible for the increased reactivity, but since this fact has not been definitely established it may prove to be a characteristic of the product engendered entirely by virtue of its preparation utilizing natural gas as a reduction agent. In any case, this activated form of $UO_2$ exhibits characteristics so radically different from conventional forms of $UO_2$ that it cannot be maintained that these two forms of this compound are identical except in chemical formula.

Generally speaking, ordinary commercial forms of $UO_2$ exhibit no pronounced tendency to oxidize in ordinary air at room temperature; whereas the activated form of $UO_2$ as prepared according to the present invention is characterized by rapid oxidation under these conditions. Similarly, ordinary commercial forms of $UO_2$ may be chlorinated with $CCl_4$ vapor to produce $UCl_4$ only at a moderate rate; whereas the activated form of $UO_2$ may be rapidly chlorinated with $CCl_4$ vapor to produce the product mentioned.

In accordance with the present invention, commercial $UO_2$, or any other uranium oxide, is subjected to a series of oxidation-reduction operations to produce a form of $UO_2$ of greatly enhanced reactivity. Thus, it has been found that by treating commercial $UO_2$ or other uranium oxide at an elevated temperature of between 335° and 485° C. with first a methane containing gas, then with an oxygen containing gas and following this with a second treatment with a methane containing gas, the elevated temperature being maintained within the aforesaid range throughout substantially the entire period of treatment, the original relatively stable charge of $UO_2$ or other uranium oxide will be transformed into an active form of $UO_2$ which is characterized by rapid oxidation in air and rapid chlorination with carbon tetrachloride vapor at an elevated temperature.

Accordingly, it is an object of this invention to provide a method of producing an activated form of $UO_2$.

Another object of the invention is to provide a process whereby activated $UO_2$ may be easily produced from any uranium oxide as a starting material.

Another object of the invention is to provide a process wherein an activated form of $UO_2$ is prepared by subjecting any uranium oxide to consecutive treatments with first a methane containing gas, then with an oxygen containing gas, and then again with a methane containing gas while at an elevated temperature.

Another object is to provide a process whereby commercial $UO_2$ may be transformed to a highly active form of $UO_2$ which is characterized by rapid oxidation in ordinary air at room temperature and by rapid chlorination with $CCl_4$ vapor at an elevated temperature.

Another object of the invention is to provide an improved process for the production of a highly active form of $UO_2$ which is particularly well suited for use as an intermediate in the production of $UCl_4$.

The invention, both as to its organization and method of operation, together with further objects and advantages thereof, will best be understood by reference to the following specification.

In carrying out my invention, a suitable reaction chamber such as an elongated tube of pyrex, quartz or the like is swept clear of air by employing a stream of nitrogen which has been passed through a drying agent such as $H_2SO_4$. A suitable charge of uranium oxide, for example, commercial $UO_2$, is then placed in the chamber, heated to a temperature within the range 335° to 485° C., and contacted with a stream of natural gas consisting essentially of $CH_4$. Preferably, the natural gas is first passed through a drying agent such as $H_2SO_4$ before it is admitted through a first tube extending into the chamber, in order positively to insure that no moisture is transferred to the charge. The reaction gases produced, together with excess natural gas, are conducted from the chamber through a second tube leading out of the chamber. After a suitable time, the gas is shut off and a stream of nitrogen or other inert gas is introduced into the chamber to sweep out reaction gases and any excess natural gas still remaining. The charge is then contacted with a stream of gas containing oxygen. At this temperature the charge is oxidized rapidly to a greenish solid, probably $U_3O_8$. The treatment with oxygen is followed with another sweep with nitrogen or other inert gas and then a second treatment with natural gas consisting essentially of $CH_4$. This second treatment with natural gas should be continued for a slightly longer period of time to insure a complete reduction to active $UO_2$. Following the final treatment of the charge with natural gas consisting essentially of $CH_4$, the reaction products will of course include $UO_2$, $CO_2$ and $H_2O$. The reaction gases including $CO_2$ and water vapor are swept from the flask by the excess natural gas whereby the $UO_2$ produced is substantially completely dry and is in the form of a chocolate brown powder.

After the uranium oxide charge has been converted into the activated product $UO_2$, the chamber is detached and transferred to a drying cabinet containing an atmosphere of $CO_2$ and is opened. The product $UO_2$ is then bottled in an atmosphere of $CO_2$ or in a vacuum and sealed for future use. The product $UO_2$ so produced is particularly well suited for use in the process of producing $UCl_4$ disclosed in the previously mentioned copending application of James M. Carter.

While analyses clearly indicate that the product produced in accordance with the present process has a composition corresponding to the chemical formula $UO_2$ it is apparent that this product differs markedly from usual commercial forms of $UO_2$ as it is in a highly active state and, in fact, constitutes activated $UO_2$. This fact is readily evidenced by the special properties of the activated $UO_2$ as contrasted with the ordinary properties of commercial $UO_2$. For example, this activated $UO_2$ is rapidly oxidized in ordinary air at room temperature, producing $U_3O_8$; whereas commercial $UO_2$ exhibits no oxidation in ordinary air until it is heated to a temperature of the order of 100° C. Also, this activated $UO_2$ may be rapidly chlorinated with $CCl_4$ vapor to produce $UCl_4$, as disclosed in the previously mentioned copending application of James M. Carter; whereas commercial $UO_2$ may be so chlorinated only at a moderate rate.

The relative activities of commercial $UO_2$ and the active form of $UO_2$ produced by my invention were compared by treating a sample of each of them with carbon tetrachloride vapor at a temperature of about 400° C. Each sample was first heated to 400° C. and each was treated with carbon tetrachloride vapor for approximately thirty minutes with the following results:

| Solid used | Conversion to $UCl_4$ |
| --- | --- |
| $UO_2$ treated in accordance with the present invention. | Practically 100%. |
| Commercial $UO_2$ | 32%. |

When $U_3O_8$ or $UO_3$ instead of commercial $UO_2$ are used as starting material it may be preferred to carry out the initial reduction step for a somewhat longer time to insure complete reduction to $UO_2$. With this exception the treatment as outlined is applicable to any uranium oxide.

While there has been described what is at present considered to be the preferred embodiment of the invention, it will be understood that various modifications may be made therein and it is intended to cover all such modifications as fall within the scope of the appended claims.

What is claimed is:
1. The process for the production of an activated form of $UO_2$ comprising heating a uranium oxide to a temperature between 335° and 485° C., subjecting the heated uranium oxide to consecutive treatments first with a methane containing gas, second, an oxygen containing gas, and third, a methane containing gas.

2. The process for the production of a form of $UO_2$ which is characterized by rapid oxidation in air at room temperature and by rapid chlorination with carbon tetrachloride at an elevated temperature comprising heating a uranium oxide to a temperature between 335° and 485° C., contacting the heated uranium oxide with natural gas consisting essentially of $CH_4$, flushing the reaction chamber clear of reaction gases and excess natural gas with an inert gas, contacting the resulting methane treated product with an oxygen containing gas, sweeping the system clear of reaction products and excess oxygen with an inert gas, and then contacting the resulting oxidized uranium oxide with a methane containing gas.

3. The process as defined in claim 1, wherein said uranium oxide which is subjected to treatment comprises a relatively nonreactive form of $UO_2$.

4. The process as defined in claim 1, wherein said uranium oxide which is subjected to treatment comprises $U_3O_8$.

5. The process as defined in claim 1, wherein said uranium oxide which is subjected to treatment comprises $UO_3$.

6. The process for the production of a form of $UO_2$ which is characterized by rapid oxidation in ordinary air at room temperature and by rapid chlorination with carbon tetrachloride at an elevated temperature comprising heating a material selected from the group consisting of $UO_3$, $U_3O_8$ and $UO_2$ to a temperature between 335° C. and 485° C., contacting the heated material with natural gas consisting essentially of $CH_4$, flushing the reaction chamber clear of reaction gases and excess natural gas with nitrogen, contacting the resulting methane treated product with an oxygen containing gas, sweeping the reaction chamber clear of gaseous reaction products and excess oxygen with nitrogen, and then contacting the resulting oxidized uranium oxide with a methane containing gas.

References Cited in the file of this patent

Peligot: Annales de Chimie et de Physique, 3rd Ser., vol. 5, pp. 23 and 24 (1842).

Gmelin - Kraut: "Handbuch der Anorganischen Chemie," vol. III, part 1, page 1537; pub. by Carl Winters' Universitatsbuchhandlung, Heideberg (1912).

Mellor: "Inorganic and Theoretical Chemistry," vol. XII, pp. 40, 42; pub. by Longmans, Green and Co., London (1932).